(No Model.)

H. D. DAVIS.
BINDING OR WRAPPER HOOK.

No. 574,526. Patented Jan. 5, 1897.

Witnesses
B. P. Shepherd.
M. E. Gooley

Inventor
Henry D. Davis
By Paul Hawley
his attorneys

UNITED STATES PATENT OFFICE.

HENRY D. DAVIS, OF EAU CLAIRE, WISCONSIN.

BINDING OR WRAPPER HOOK.

SPECIFICATION forming part of Letters Patent No. 574,526, dated January 5, 1897.

Application filed April 17, 1896. Serial No. 587,990. (No model.)

*To all whom it may concern:*

Be it known that I, HENRY D. DAVIS, of Eau Claire, county of Eau Claire, State of Wisconsin, have invented certain new and useful Improvements in Binding or Wrapper Hooks, of which the following is a specification.

My invention relates to hooks to be used in connection with binding-chains for binding logs upon a sled, car, or wagon; and the object I have in view is to provide a device by means of which the logs may be securely held in position, and which may be easily and quickly released when it is desired to unload the logs without danger to the person unfastening the chain.

My invention consists generally in providing a hook having its looped end, at one side of the center, pivoted to one end of a chain, the loop in the end of said hook being adapted to receive the free end of the chain, and the shank of said hook being adapted to enter a link carried by said chain, whereby said hook will be locked securely in position until released by the operator when it is desired to unload the logs, all as hereinafter described, and particularly pointed out in the claims.

Figure 1:
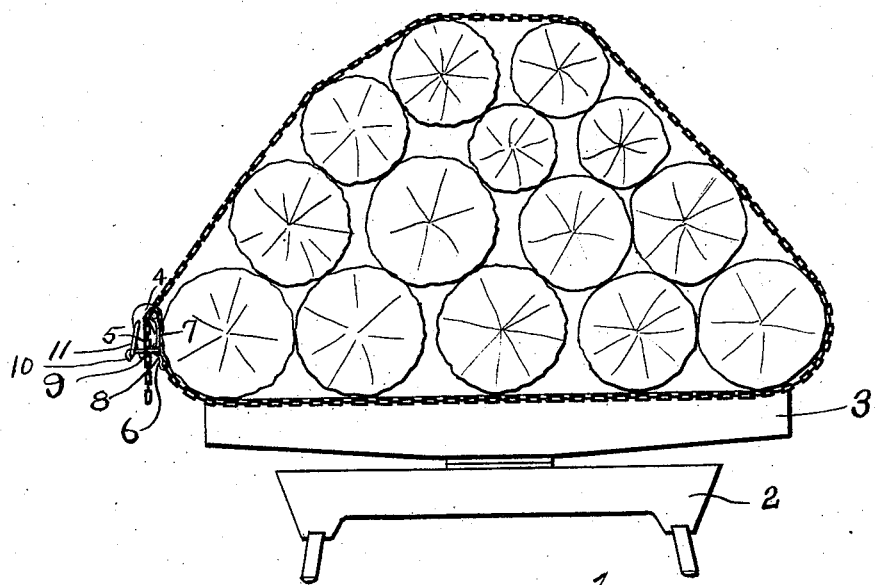
Figures 2, 3:
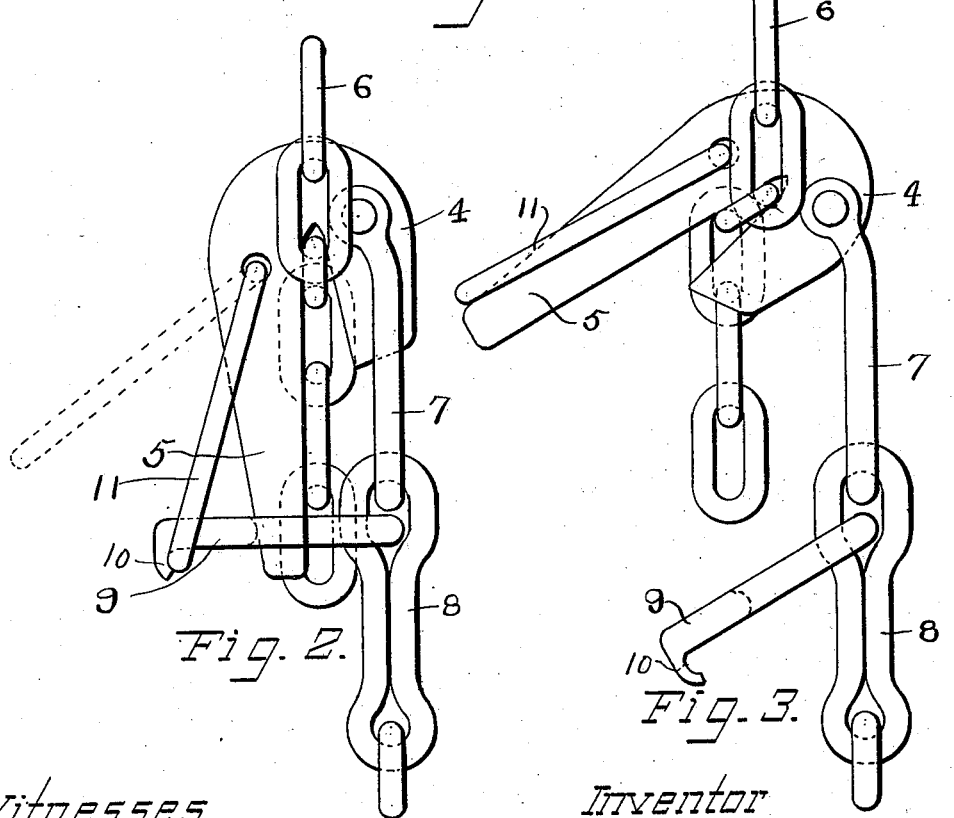

In the accompanying drawings, forming part of this specification, Figure 1 is an end view of a load of logs, showing the application of my device. Fig. 2 is a side view of the device when locked. Fig. 3 is a similar view showing the device unlocked.

In the drawings, 2 represents the frame of a sled or car which supports the bunks on which the logs are loaded.

The hook is provided with the turned end 4 and a long shank 5, a wedge-space being provided between the end 4 and the shank 5 to receive a link of the chain 6 when it is desired to bind the load, and a link 7 is pivoted to the end 4 of the hook, and at its opposite end is provided with a link 8, which may be closed near its middle portion, and which is provided at its end, near the link 7, with a link 9, which is adapted to receive the end of the shank 5 when it is desired to lock the free end of the chain 6. The free end of the link 9 is provided with a lug or shoulder 10, and a link 11 is pivoted to the upper end of the shank 5, and is adapted to receive the end of the link 9 and to be held in position thereon by the lug or shoulder 10.

The operation of the device is as follows: The desired number of logs having been loaded on the sled or car, the chain is passed around the same and one of the links at its free end inserted into the space provided between the shank 5 and the part 4 of the hook, as shown in Fig. 3. The shank 5 is then drawn down to the position shown in Fig. 2 and the link 9 slipped over the end of the same, whereby the shank 5 will be held securely in position, and the link 9 is locked by passing the end of the link 11 over the shoulder 10 on the end of the link 9. When it is desired to unload the logs, the link 11 is disengaged from the link 9, and the operator can then stand at a distance and strike the upper side of the link 9 with a pole or bar and disengage the same from the shank 5, thereby permitting the logs to roll off the car or sled. The tension upon the chain will hold the end of the shank 5 in close engagement with the link 9, so that it will not slip off the end of the shank until quite a heavy blow has been struck upon its upper side.

A device of this kind is of very great value in handling logs, for by its use one man can unbind and unload the whole load of logs without being in danger of life or limb during the operation.

Having thus described my invention, I claim as new and desire to secure by Letters Patent—

1. A wrapper or binding hook, comprising a shank 5 having a turned end 4, a space being provided between said shank and said end to receive a link at one end of the chain, the link 7 pivoted to the turned end 4 and carrying the link 8, and the part 9 pivoted to said link 8 and adapted to receive the end of said shank 5, substantially as described.

2. A wrapper or binding hook, comprising a shank 5 and turned end 4, having the wedge-shaped space between them, the link 7 pivoted to said part 4 and carrying the link 8, the part 9 pivoted to said link 8 and adapted to receive the end of said shank, said part 9 having a shoulder or lug 10 and a link 11 carried by said shank, and adapted to receive the end of said part 9, for the purpose set forth.

In testimony whereof I have hereunto set my hand this 7th day of April, A. D. 1896.

HENRY D. DAVIS.

In presence of—
D. S. THOMAS,
JESSIE M. HOWLAND.